(12) United States Patent
O'Rourke et al.

(10) Patent No.: US 7,770,215 B2
(45) Date of Patent: *Aug. 3, 2010

(54) METHOD FOR PROTECTING A FIREWALL LOAD BALANCER FROM A DENIAL OF SERVICE ATTACK

(75) Inventors: Chris O'Rourke, Apex, NC (US); Gaurang K. Shah, Cary, NC (US); Louis F. Menditto, Raleigh, NC (US); Mark Albert, Morrisville, NC (US); Michael S. Sutton, Garner, NC (US); Pranav K. Tiwari, Raleigh, NC (US); Robert M. Batz, Raleigh, NC (US); Richard Gray, Cary, NC (US); Sean W. Hull, Raleigh, NC (US); Tzu-Ming Tsang, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

This patent is subject to a terminal disclaimer.

(21) Appl. No.: 11/554,081

(22) Filed: Oct. 30, 2006

(65) Prior Publication Data

US 2008/0028456 A1   Jan. 31, 2008

Related U.S. Application Data

(63) Continuation of application No. 09/788,690, filed on Feb. 19, 2001, now Pat. No. 7,131,140, which is a continuation of application No. 09/751,318, filed on Dec. 29, 2000, now abandoned.

(51) Int. Cl.
*G06F 9/00* (2006.01)

(52) U.S. Cl. .................. 726/11; 726/3; 726/12; 726/13; 709/223; 709/224; 709/225

(58) Field of Classification Search .......... 726/11–13, 726/3; 709/223–225
See application file for complete search history.

(56) References Cited

U.S. PATENT DOCUMENTS 4,857,912 A   8/1989   Everett, Jr. et al. ........ 340/825.3

(Continued)

OTHER PUBLICATIONS

Information Sciences Institute, "Internet Protocol, DARPA Internet Program Protocol Specification," Univ. of Southern Califorinia, 49 pgs., Sep. 1981.

(Continued)

*Primary Examiner*—Thanhnga B Truong
(74) *Attorney, Agent, or Firm*—Baker Botts L.L.P.

(57) ABSTRACT

A method for protecting firewall load balancers from a denial of service attack is provided. Packets are received by the firewall load balancer. Each packet has a source and a destination. The firewall load balancer is equipped with a connection database that can contain entries about the packets. Upon receipt of a packet, the connection database is queried to determine whether or not there is an entry for the received packet. If an entry is found in the database, the packet is forwarded to its destination. Otherwise, if the packet was received from a firewall, then a new connection entry for the packet is built and is saved to the connection database and the packet is forwarded on to its destination. If the packet does not have an entry (match) in the connection database and the packet was not received from a firewall, then the packet is forwarded to a firewall.

21 Claims, 6 Drawing Sheets

U.S. PATENT DOCUMENTS

| | | | |
|---|---|---|---|
| 5,511,122 A | 4/1996 | Atkinson | 380/25 |
| 5,627,819 A | 5/1997 | Dev et al. | 370/250 |
| 5,708,659 A | 1/1998 | Rostoker et al. | 370/392 |
| 5,740,438 A | 4/1998 | Ratcliff et al. | 709/250 |
| 5,774,660 A | 6/1998 | Brendel et al. | 395/200.31 |
| 5,835,726 A | 11/1998 | Shwed et al. | 709/229 |
| 5,892,903 A | 4/1999 | Klaus | 395/187.01 |
| 5,937,159 A | 8/1999 | Meyers et al. | 395/187.01 |
| 5,951,694 A | 9/1999 | Choquier et al. | 714/15 |
| 6,006,264 A | 12/1999 | Colby et al. | 709/226 |
| 6,016,305 A | 1/2000 | Borst et al. | 370/234 |
| 6,061,798 A | 5/2000 | Coley et al. | 713/201 |
| 6,101,170 A | 8/2000 | Doherty et al. | 370/255 |
| 6,128,642 A | 10/2000 | Doraswamy et al. | 709/201 |
| 6,128,657 A | 10/2000 | Okanoya et al. | 709/224 |
| 6,137,777 A | 10/2000 | Vaid et al. | 370/230 |
| 6,185,619 B1 | 2/2001 | Joffe et al. | 709/229 |
| 6,201,962 B1 | 3/2001 | Sturniolo et al. | 455/432 |
| 6,212,558 B1 | 4/2001 | Antur et al. | 709/221 |
| 6,243,360 B1 | 6/2001 | Basilico | 370/231 |
| 6,249,801 B1 | 6/2001 | Zisapel et al. | 709/105 |
| 6,253,337 B1 | 6/2001 | Maloney et al. | 714/38 |
| 6,256,773 B1 | 7/2001 | Bowman-Amuah | 717/1 |
| 6,263,368 B1 | 7/2001 | Martin | 709/224 |
| 6,298,383 B1 | 10/2001 | Gutman et al. | 709/229 |
| 6,304,262 B1 | 10/2001 | Maloney et al. | 345/418 |
| 6,304,973 B1 | 10/2001 | Williams | 713/201 |
| 6,321,336 B1 | 11/2001 | Applegate et al. | 713/201 |
| 6,327,622 B1 | 12/2001 | Jindal et al. | 709/228 |
| 6,330,602 B1 | 12/2001 | Law et al. | 709/224 |
| 6,370,573 B1 | 4/2002 | Bowman-Amuah | 709/223 |
| 6,377,571 B1 | 4/2002 | Tai | 370/355 |
| 6,377,982 B1 | 4/2002 | Rai et al. | 709/217 |
| 6,393,458 B1 | 5/2002 | Gigliotti et al. | 709/203 |
| 6,393,482 B1 | 5/2002 | Rai et al. | 709/225 |
| 6,400,722 B1 | 6/2002 | Chuah et al. | 370/401 |
| 6,414,950 B1 | 7/2002 | Rai et al. | 370/338 |
| 6,421,714 B1 | 7/2002 | Rai et al. | 709/217 |
| 6,424,621 B1 | 7/2002 | Ramaswamy et al. | 370/230 |
| 6,434,618 B1 | 8/2002 | Cohen et al. | 709/228 |
| 6,442,165 B1 | 8/2002 | Sitaraman et al. | 370/395.4 |
| 6,452,915 B1 | 9/2002 | Jorgensen | 370/338 |
| 6,466,571 B1 | 10/2002 | Dynarski et al. | 370/352 |
| 6,473,802 B2 | 10/2002 | Masters | 709/229 |
| 6,484,143 B1 | 11/2002 | Swildens et al. | 705/1 |
| 6,496,935 B1 | 12/2002 | Fink et al. | 713/201 |
| 6,512,754 B2 | 1/2003 | Feder et al. | 370/338 |
| 6,519,703 B1 | 2/2003 | Joyce | 713/201 |
| 6,529,501 B1 | 3/2003 | Zhao et al. | 370/353 |
| 6,536,037 B1 | 3/2003 | Guheen et al. | 717/151 |
| 6,546,423 B1 | 4/2003 | Dutta et al. | 709/225 |
| 6,549,208 B2 | 4/2003 | Maloney et al. | 345/473 |
| 6,550,012 B1 | 4/2003 | Villa et al. | 713/201 |
| 6,578,147 B1 | 6/2003 | Shanklin et al. | 713/200 |
| 6,606,316 B1 | 8/2003 | Albert et al. | 370/389 |
| 6,606,744 B1 | 8/2003 | Mikurak | 717/174 |
| 6,615,166 B1 | 9/2003 | Guheen et al. | 703/27 |
| 6,665,702 B1 | 12/2003 | Zisapel et al. | 718/105 |
| 6,701,374 B2 | 3/2004 | Gupta et al. | 709/238 |
| 6,742,045 B1 | 5/2004 | Albert et al. | 709/238 |
| 6,775,280 B1 | 8/2004 | Ma et al. | 370/392 |
| 6,792,463 B1 | 9/2004 | Lamberton et al. | 709/227 |
| 6,880,089 B1 | 4/2005 | Bommareddy et al. | 726/11 |
| 2003/0229809 A1 | 12/2003 | Wexler et al. | 713/201 |

OTHER PUBLICATIONS

S. Deering, "Host Extensions for IP Multicasting," Stanford University, 17 pgs., Aug. 1989.

METHOD FOR PROTECTING A FIREWALL LOAD BALANCER FROM A DENIAL OF SERVICE ATTACK

CROSS REFERENCE TO RELATED APPLICATION

This application is a continuation of U.S. application Ser. No. 09/788,690 filed Feb. 19, 2001 and entitled "Method for Protecting a Firewall Load Balancer From a Denial of Service Attack" which is a continuation of U.S. application Ser. No. 09/751,318 filed Dec. 29, 2000 and entitled "Method for Protecting a Firewall Load Balancer From a Denial of Service Attack", abandoned.

TECHNICAL FIELD OF THE INVENTION

The present invention is related to the security of networked computers. More specifically, the present invention is related to a method for protecting the devices that balance the workload among multiple firewalls in a computer network.

BACKGROUND OF THE INVENTION

The Internet has experienced, and will continue to experience, explosive growth. As originally designed, the Internet was to provide a means for communicating information between public institutions, particularly universities, in a semi-secure manner to facilitate the transfer of research information. However, with the development and provision of user-friendly tools for accessing the Internet, such as the World Wide Web (the Web), the public at large is increasingly turning to the Internet as a source of information and as a means for communicating.

Because of the growth of the Internet and corporate intranets, the services provided over networks have become more diverse and sophisticated. As a result, increasingly complex schemes have been developed to respond to client generated network traffic and to service client requests. In some of these schemes, a single device is placed on the network that is responsible to direct packets to other devices or to filter packets that are bound for a number of other devices for some purpose such as security or load balancing. Such devices, when implemented, are critical to the operation of a network because they often represent a single point of failure that may prevent either the entire network or a substantial portion of the network from functioning.

Provision of a Web home page involves establishing a user accessible file at a Web site. The Web site can be established either on a computing system on the premises of the business or institution that providing the home page, or by contracting to have the home page built and supported on the computing facilities of an Internet Service Provider (ISP).

Use of a company's computing system for support of a publicly accessible system, such as a Web site, can present a threat to the company's internal systems that share the same computing platform or are connected to the publicly accessible computing platform. Furthermore, in cases where sensitive information is transmitted over the Internet to a company, such information is usually stored on the same computing system that is used for running the on-line Internet system. Handling of such information over a public network such as the Internet requires some measure of security to prevent the information from being intercepted. However, a more important consideration is maintaining the security of such information once it is received and stored in a computing system that is connected to the Internet.

Most computer crime is not in the form of data interception, but involves a network intruder, or "cracker" entering a publicly accessible computing system and subverting security systems to access stored information. In the recent past, there have been several publicized cases where crackers have stolen proprietary information from purportedly secure computers over the Internet.

In many cases where a publicly accessible application, such as a Web home page, is set up on a business or institution's premises, it is grafted onto an existing computing system. The existing system also may contain other computing resources, such as databases and/or internal network systems that are not intended for public access. Provision of a publicly accessible on-line system, such as a Web server, on such a system can provide a scenario that can be exploited by network intruders who may attempt to reach systems beyond the Web server using it, or other systems bundled on the computing platform, as access paths. A company or institution may attempt to protect these surrounding systems by password protecting them or by concealing them from the public with a system called a firewall.

The term "firewall" was coined in the computer network art to describe a system for isolating an internal network, and/or computers, from access through a public network to which the internal network or computers are attached. An example of a firewall system is described in U.S. Pat. No. 6,061,797. The purpose of a firewall is to allow network elements to be attached to, and thereby to access, a public network without rendering the network elements susceptible to access from the public network. A successful firewall allows for the network elements to communicate and transact with the public network elements without rendering the network elements susceptible to attack or unauthorized inquiry over the public network.

Firewalls have become an integral part of a network that is connected to the Internet or other wide-area network (WAN). As mentioned before, as network traffic increases—and the increased economic importance of that traffic—so does the need for increased security. To alleviate the demand on any one machine, and to prevent any single device from being a single point of failure, firewalls have been duplicated to form a firewall "bank." Multiple firewall machines can be operative within the firewall bank in order to distribute the firewall workload among multiple machines in order to increase performance.

Firewall banks have created a need for methods and devices that balance the workload among the elements of the firewall bank. These devices are called firewall load balancers. In a typical configuration, there are firewall load balancers on either side of the firewall bank. The firewall load balancer that sits outside (i.e., on the Internet side) of the firewall is used to balance incoming traffic among the firewalls within the firewall bank. Similarly, the firewall load balancer that sits on the inside portion of the firewall is used to balance the load emanating from the servers that are servicing the requests originating from outside the firewall.

Crackers have been known to inundate a port, such as a telnet, http, or ftp port, with large numbers of slightly varying access requests in order to consume available memory and CPU cycles on the attacked device. This method of attack is known as a "denial of service attack." Specifically, the attacked device is inundated with requests that consume its resources and either cause it to crash or otherwise to slow down to the point where it cannot service legitimate requests. A more comprehensive discussion of denial of service attacks is presented by the CERT Coordination Center and is available on the Internet at <http://www.cert.org/tech_tips/denial_of_service.html>. The typical response to a denial of service attack is to have the operating system (OS) shut down the targeted port for a period of time, thereby denying the service of that port both to the attacker and, unfortunately, to legitimate customers. This defensive response is necessitated by the inefficiency of conventional port processing. The chain of processes associated with monitoring, managing, and verifying port connections is very inefficient. Consequently, the conventional defense is to have the OS shut down the port for a period of time. This security technique prevents entry into a system through that port and restores the availability of system resources to the remaining ports. This defensive measure is unacceptable because it concedes defeat (i.e., the denial of service) to the attacker.

Aside from the packet flooding tactic, other denial of service attacks entail the disruption or overwhelming of components within a computer system. Firewalls can become a target of the attacker as well because if the firewalls are disabled, the connection to the wide-area network is also disabled. From an attacker's standpoint, this is equally as effective as disabling the servers. As firewalls are vulnerable to the denial of service attack, so too are their load balancers. The firewall load balancers also may be inundated with the denial of service's packets and exhaust their resources. There is, therefore, a need in the art for a firewall load balancer that can operate effectively while conserving resources so that it can withstand a denial of service attack.

SUMMARY OF THE INVENTION

The present invention solves the problems inherent in the prior art by providing a method for protecting firewall load balancers from a denial of service attack. Packets are received by the firewall load balancer. Each packet has a source and a destination. The firewall load balancer is equipped with a connection database that can contain entries about the packets. Upon receipt of a packet, the connection database is queried to determine whether or not there is an entry for the received packet. If an entry is found in the database, the packet is forwarded to its destination. Otherwise, if the packet was received from a firewall, then a new connection entry for the packet is built and is saved to the connection database, and the packet is forwarded on to its destination. If the packet does not have an entry (match) in the connection database and the packet was not received from a firewall, then the packet is forwarded to a firewall.

Alternate embodiments of the present invention further discriminate the origin and destination of the packet or, in the alternative, modify the order of the discrimination in order to enhance security and/or performance of the overall system.

Other and further objects, features, and advantages will be apparent from the following description of presently preferred embodiments of the invention, given for the purpose of disclosure and taken in conjunction with the accompanying drawings.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

The present invention deals with the routing of messages on a network. To prevent delay, buffer overflows, or congestion, long messages are broken into shorter bit strings called packets. These packets can then be transmitted though the network as individual entities and reassembled into messages at the destination. Thus, packets have a source (the device that generated the packet) and a destination.

Figure 1:
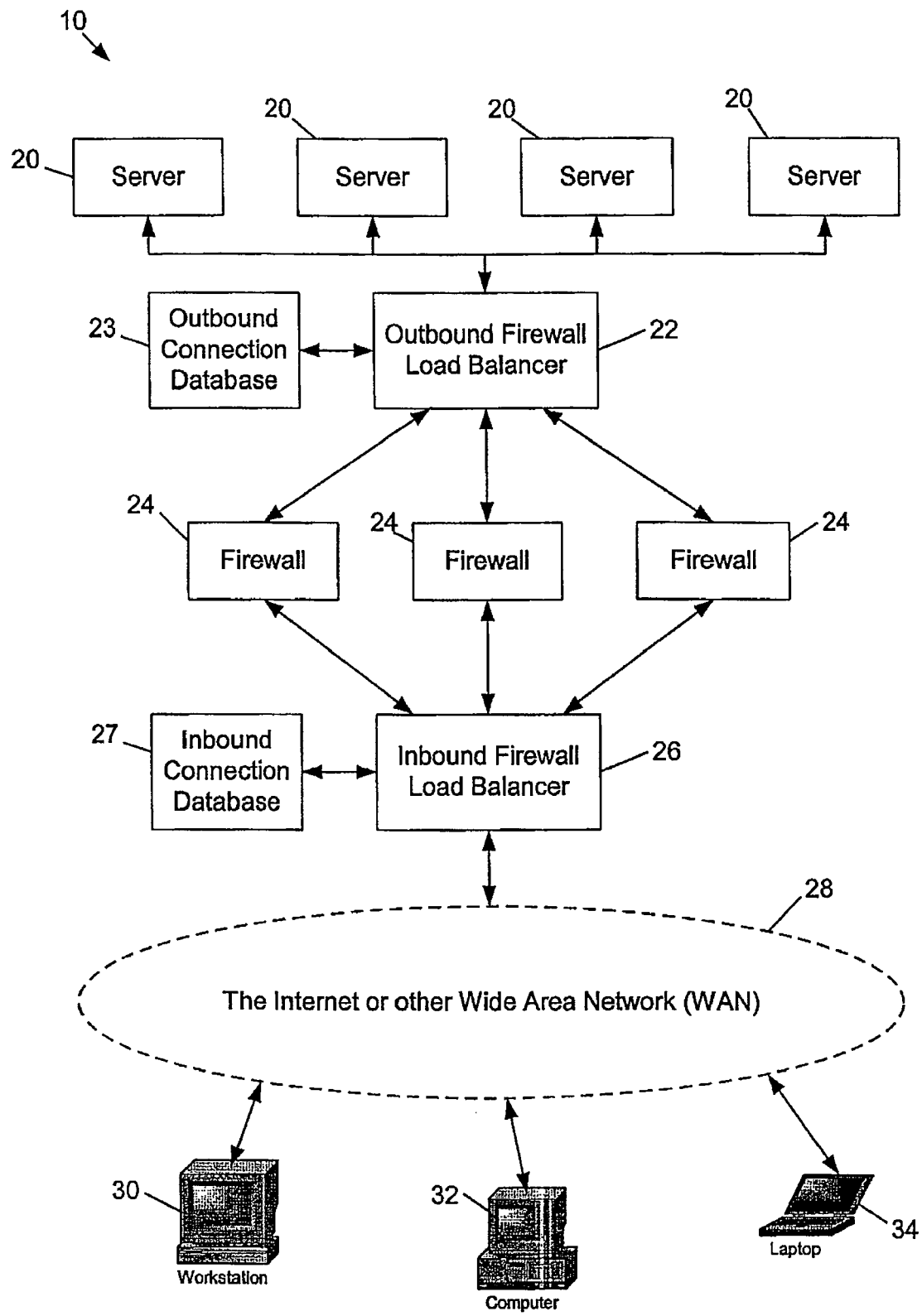
FIG. 1 is a block diagram of the system configuration of the present invention.

The configuration of the present invention is illustrated in FIG. 1. As shown in FIG. 1, an array of servers 20 are used to service requests from clients 30, 32, and 34. In general, messages in the form of one or more inbound packets are transmitted from, for example, client 30 through the wide-area network 28 to the inbound firewall load balancer 26. Depending upon the workload of the various firewalls 24 that make up the firewall bank, the inbound firewall load balancer will direct the inbound packet to one of the firewalls 24. The firewall will perform its functions and forward the inbound packet to the outbound firewall load balancer 22, which will then forward the inbound packet to one of the servers 20 for processing.

Once the request has been serviced, the response is transmitted from the server to the client as follows. The response, in the form of one or more outbound packets, is transmitted first to the outbound firewall load balancer 22. From there, the outbound packets will typically be forwarded to the same firewall 24 that serviced the packets of the inbound request. Once processed by the firewall 24, the outbound packet will be forwarded to the inbound firewall load balancer 26 and then on to the wide-area network 28 (such as the Internet) and arrives at the client machine 30.

Both firewall load balancers of the present invention have their own connection databases. Specifically, the outbound firewall load balancer 22 is in operative communication with the outbound connection databases 23 and the inbound connection database 27 is in operative communication with the inbound firewall load balancer 26. These databases are used in conjunction with the method of the present invention (described below). It should be noted that the two connection databases 23 and 27 can be consolidated into a single database. However, in doing so, one may have to breach the security provided by the firewalls 24 that protect the servers 20 because the same connection database would have to service both the outbound firewall load balancer 22 and the inbound firewall load balancer 26 which are on opposite sides of the firewall. Security would not necessarily be breached, however, if only very specific signals are sent to/from the single connection database.

While the methods of the present invention can be implemented entirely in software, it is understood by those skilled in the art that the methods of the present can be implemented in either hardware or software, or any combination thereof. For instance, the apparatus of the present invention can be logic that is encoded in media which is operable with the various processors and other subsystems of the apparatus of the present invention to implement the methods of the present invention. Similarly, application specific integrated circuits (ASICs) can be used to implement various steps of the methods of the present invention.

For purposes of this disclosure, "packets" are intended to have their normal meaning, for example, a unit of information that is transmitted in a packet switched network. Typically, each packet has a packet header within which are recorded routing information in the form of, e.g., an origin IP address and a destination IP address. A "flow" is a series of packets that are sent from one entity (such as a server) to another entity (such as a client). Finally, a "connection" designates two flows, one in each direction, between the same two entities. The connection databases 23 and 27 of the present invention record the connections made between various entities.

There are various packet destination scenarios that should be considered when using the method and apparatus of the present invention. When a packet comes to a firewall loadbalancer, it is desirable to know the direction of the packet (either to or from a firewall) and if there have been other packets for this particular flow. The connection database is queried to determine whether or not other packets for that flow have been processed previously. There are four separate scenarios that must be addressed. The various scenarios depend upon whether the packet is going to or coming from a firewall and whether or not there is a record of the flow in the connection database. These scenarios, and the action needed, are summarized in Table 1.

TABLE 1

| Packet From Firewall? | Flow Recorded in Connection Database? | Action Needed |
|---|---|---|
| No | No | Forward the packet to a firewall that is determined by a stateless firewall loadbalancing algorithm. |
| No | Yes | Forward the packet as defined by the connection object in the connection database. |
| Yes | No | Build a connection object in the connection database and forward the packet towards the destination IP address in the packet. |
| Yes | Yes | Forward the packet as defined by the connection object in the connection database. |

Figure 6:
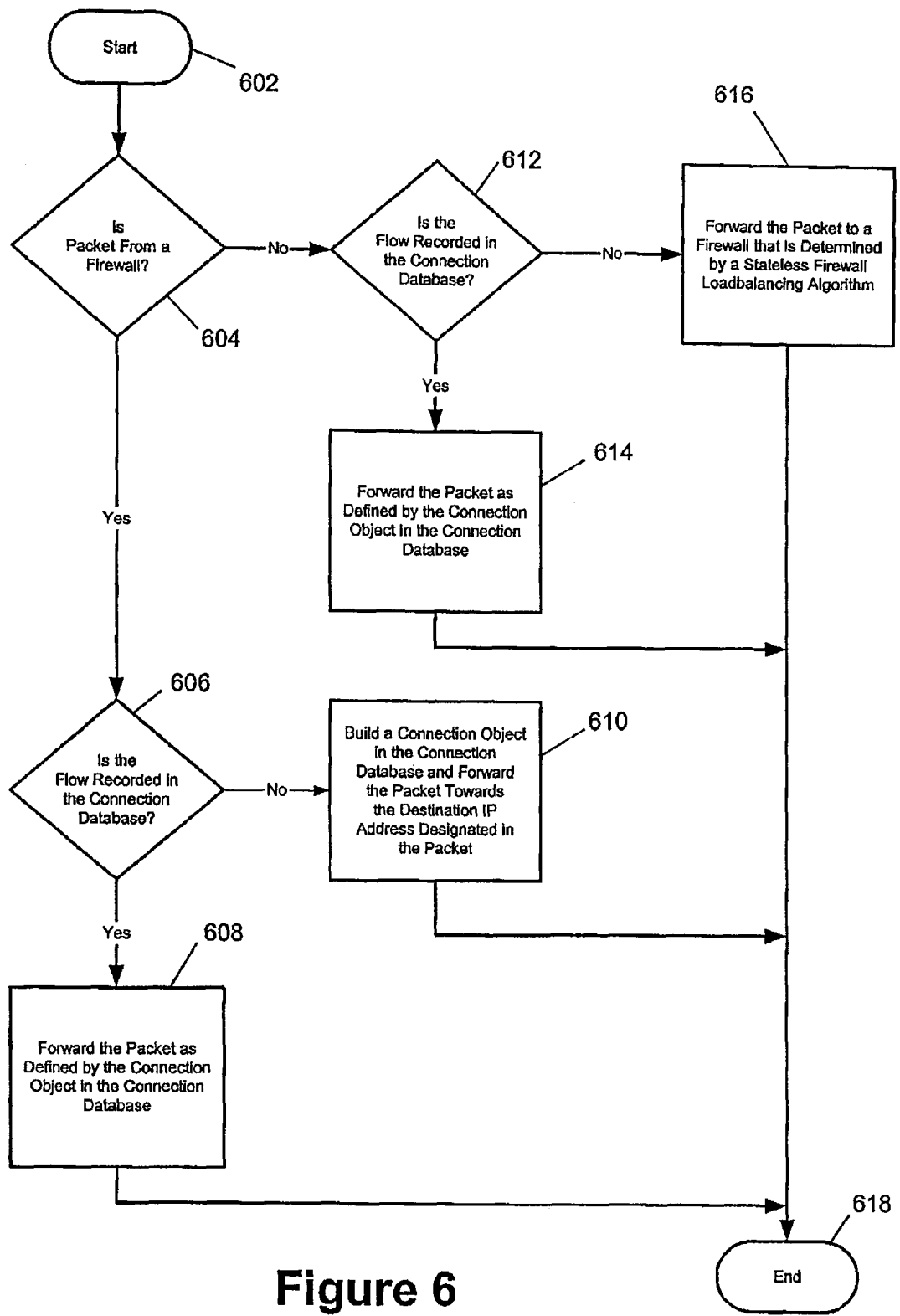
FIG. 6 is a flowchart illustrating a decision tree of the method of the present invention.

The scenarios of Table 1 can be illustrated more fully by the flowchart of FIG. 6. Specifically, FIG. 6 illustrates a decision tree method that is explained below. As shown in FIG. 6, the method starts at step 602. The first decision is taken at step 604, where a determination is made if the packet in question has been processed by a firewall. If so, then execution continues to step 606 where a determination is made whether the flow to which the packet is a part has been recorded in the connection database. This determination is accomplished by querying the connection database for a connection object matching various parameters contained within the packet header. If so, then the packet is forwarded as defined by the relevant connection object that was found in the connection database query, step 608, and the method is terminated at step 618.

If the packet has not been processed by a firewall (i.e., the result of step 604 is no), then execution jumps to step 612, where a determination is made if the flow to which the packet is a part has been recorded in the connection database. If so, then execution continues to step 614 where the packet is forwarded as defined by the connection object in the connection database. If not, then the packet is labeled as "stateless loadbalance" and the packet is forwarded to a firewall, step 616. Step 616 is generally taken when a packet is received from the wide-area network 28 (of FIG. 1) for the first time. In an embodiment of the present, a stateless algorithm is used to designate a particular firewall that will handle not only the packet in question, but all packets of the flow pertaining to that packet. The stateless algorithm is a load balancing algorithm that does not require the loadbalancer to store information about assigned connections. Any subsequent packets on these connections will produce the same loadbalancing result. Specifically, when the first packet (of a flow) is received from the Internet, the stateless algorithm is used for choosing the firewall that will be used for this and subsequent packets in the same flow. The stateless algorithm of the present invention bases its choice of firewall only on the information that is contained within the packet. The stateless algorithm of this embodiment of the present invention uses either 1) the source and destination IP addresses or 2) the source and destination IP addresses as well as the source and destination port numbers. It is important to note that this information is not saved or recorded. Consequently, no storage space is devoted to packets that get rejected by the firewall. Moreover, once the connection has been recorded (by creation of a connection object within the connection database), few resources are devoted to additional packets for that connection. It is these features that enable the firewall load balancers of the present invention to conserve resources and thus diminish and mitigate the effects of a denial of service (DoS) attack.

The connection databases 23 and 27 can use a wide variety of database engines. The best ones for the intended purpose will have fast performance and require relatively modest storage requirements. The databases will have to have the capacity to retain the desired number of 5-tuple values. The database can optionally use the 5-tuple values as a database key for database queries. The five elements of the 5-tuple consist of, for example, a source address, a destination address, a source port number, a destination port number, and a protocol identifier. Additional values can be stored to expand the functionality of the present invention. Likewise, the 5-tuple value can be reduced for increased performance and/or increased storage capacity by eliminating some of the values like, for instance, the destination port number and the source port number (although this isn't recommended). The latter embodiment is useful for specific functions where the port numbers can be assumed with confidence, albeit with reduced flexibility. For example, standard web port numbers typically are 80 (http) for non-secure web requests mail and 443 (https) for secure web requests. A web request is an example of a "sticky" transaction. A sticky transaction is one that is opened by the client, such as, an inbound request to a server and a corresponding outbound response to the client that sent that request. Thus, in the latter example, a 2-tuple value can be used because the protocol and port numbers are presumed and only the source and destination addresses need be retained.

Figure 5:
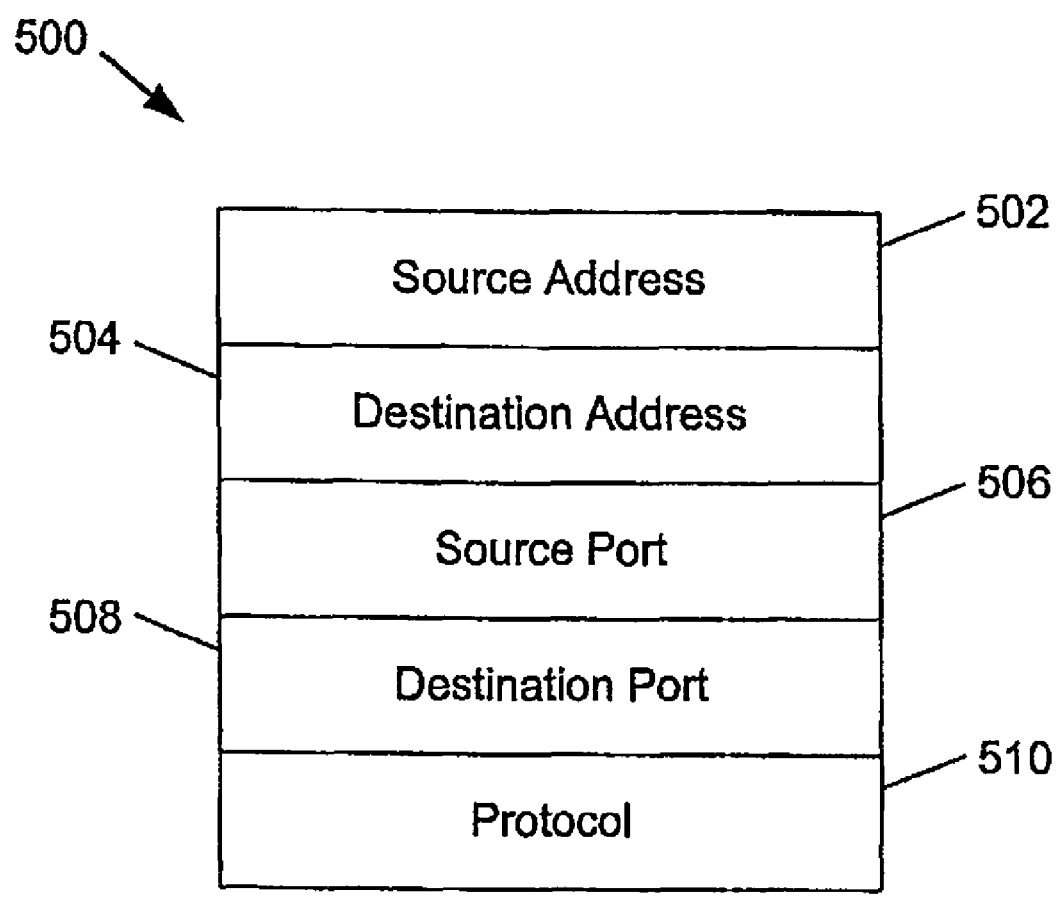
FIG. 5 is a block diagram of a 5-tuple element of the connection database of the present invention.

The structure of the 5-tuple value that is the preferred embodiment of the value of the present invention is illustrated in FIG. 5. The tuple value 500 contains a source address 502, a destination address 504, a source port 506, a destination port 508, and a protocol element 510. The 5-tuple value yields maximum utility with a minimum amount of information. Unlike the 2-tuple value mentioned previously, the 5-tuple value enables dynamic port addressing and the use of multiple protocols (e.g., TCP and UDP). The size or storage capacity of the various elements can be modified to suit the situation. It is recommended, however, that some extra space be included to accommodate future growth as addresses are expected to get longer as more and more traffic and nodes are added to the Internet and the conversion from IPv4 to IPv6 takes place.

In some embodiments of the present invention, it is necessary only to know if the packet came from a firewall before it arrived at the firewall load balancer of the present invention. In alternate embodiments, it is important to know if the packet is destined for a firewall after leaving the firewall load balancer. Consequently, in several embodiments of the present invention, checks are made to determine whether or not the packet has been processed from a firewall or is destined for a firewall. In this case, if a firewall has previously processed the packet in question, then that packet is deemed to have had a "firewall origin," even though the device that created the packet may not be a firewall. Similarly, if a packet has a routing header such that either a firewall is its next or subsequent hop, then the packet is considered to have a "firewall destination," even though the ultimate destination of the packet may not be a firewall.

Figure 4:
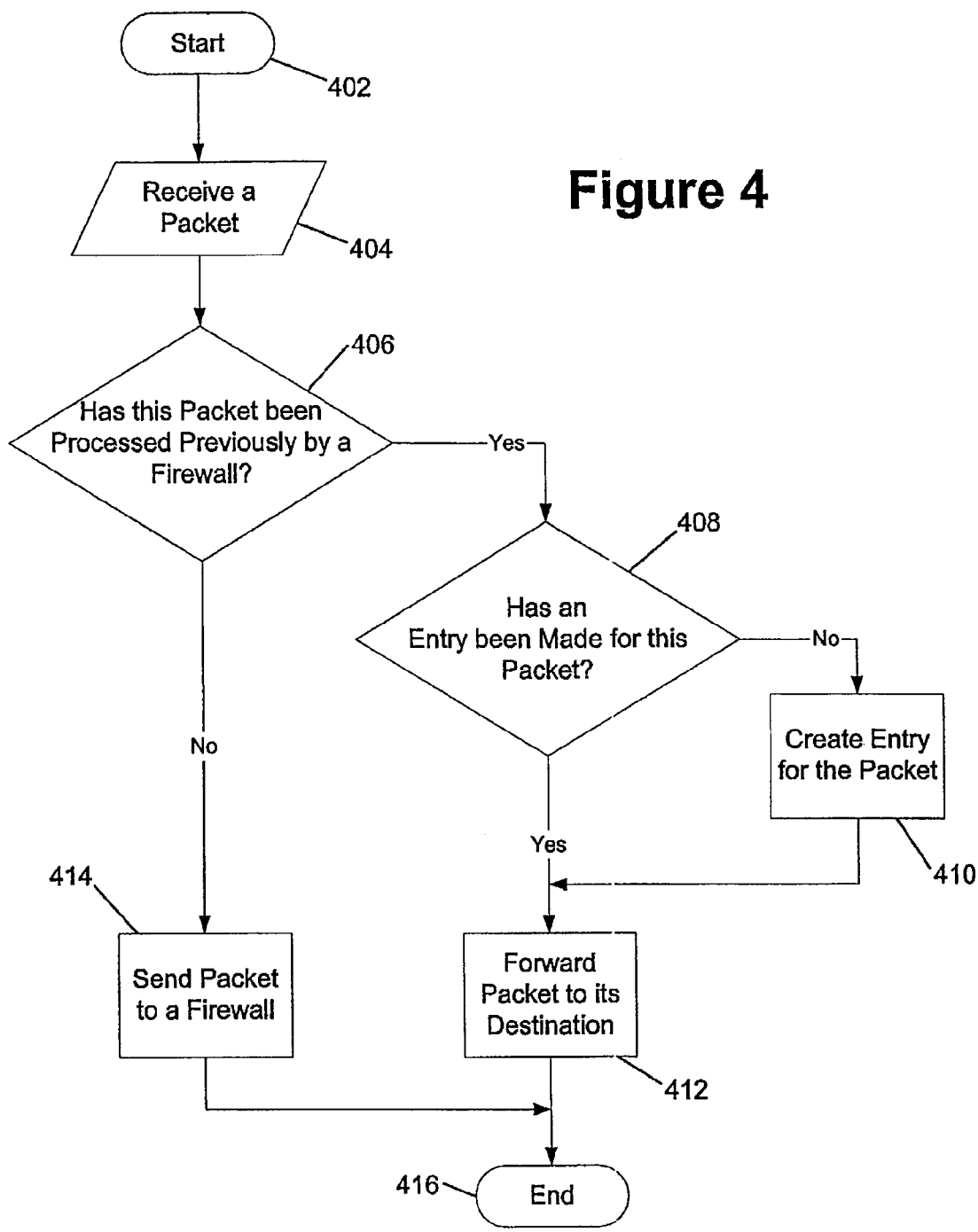
FIG. 4 is a flowchart illustrating an alternate embodiment of the method of the present invention.

An embodiment of the method of the present invention is summarized in FIG. 4. Referring to FIG. 4, the process starts at step 402. A packet is received by the firewall load balancer in step 404. A check is made to determine if the packet has been processed previously by one of the system's firewalls in step 406, i.e., a check is made to determine if the packet has a "firewall origin." Note, this check applies regardless of whether or not the source of the packet originated from one of the system's own servers or from a source outside of the firewall. If the packet has not yet been serviced by a firewall, the packet is sent to a firewall in step 414. Otherwise, a second check by the firewall load balancer is made to determine whether or not an entry (5-tuple value) has been made in the firewall load balancer's connection database for the packet in step 408. If an entry for the packet has not been found in the connection database, an entry is made in the firewall load balancer's connection database in step 410. If an entry for the packet existed, or if the entry was just created (step 410), then the packet is forwarded to its destination (i.e., to the next hop or to the destination), step 412. After either step 412 or step 414, the process ends in step 416. The rationale for making the database entry only after a firewall has had a chance to process the packet is that if the firewall drops the packet (for whatever reason), the firewall load balancer would be relieved of the need to devote resources (memory and execution cycles) for the packet in the connection database. It is this relief that provides the firewall load balancer a measure of protection from a denial of service attack.

Figure 2:
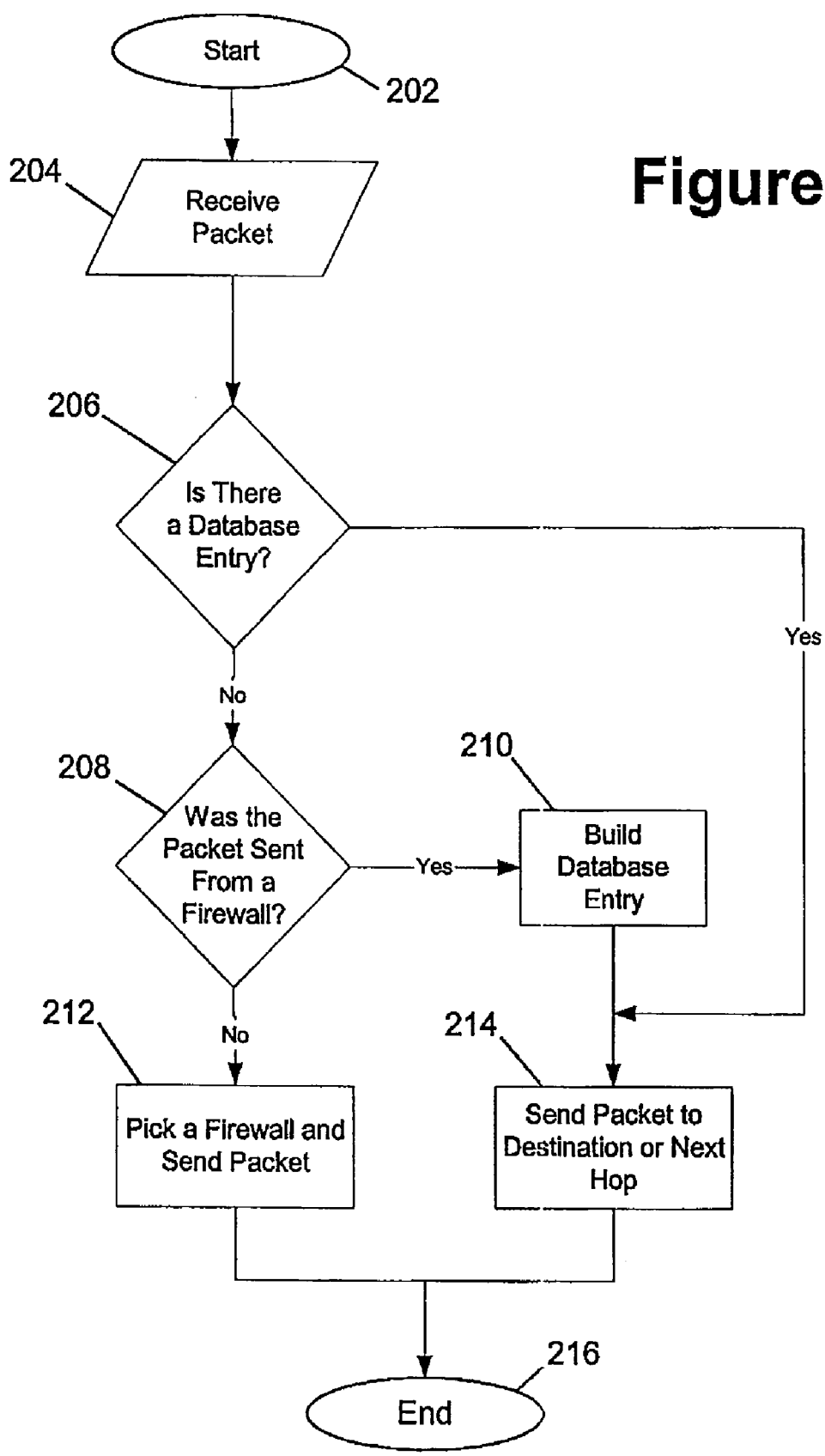
FIG. 2 is a flowchart illustrating an embodiment of the method of the present invention.

An alternative method of the present invention is illustrated in FIG. 2. Referring to FIG. 2, the process starts at step 202. A packet is received by the firewall load balancer at step 204. Thereafter, the firewall load balancer makes a check during step 206 to determine if there is an entry in the connection database for the packet. If an entry exists (i.e., the packet has been through a firewall at least once), then execution skips to step 214 and the packet is sent to its destination or to the next hop. Otherwise, step 208 is performed wherein a check is made to determine if the packet was sent from a firewall (if the packet has a firewall origin). If it has a firewall origin, then an entry is made for the packet in the firewall load balancer's connection database, step 210, and the packet is thereafter sent to its destination or to the next hop in step 214. However, if the packet was not sent from a firewall, and there is no entry in the firewall load balancer's connection database, then the packet is directed to a firewall in step 212. Execution ends in step 216 as illustrated in FIG. 2.

Figure 3:
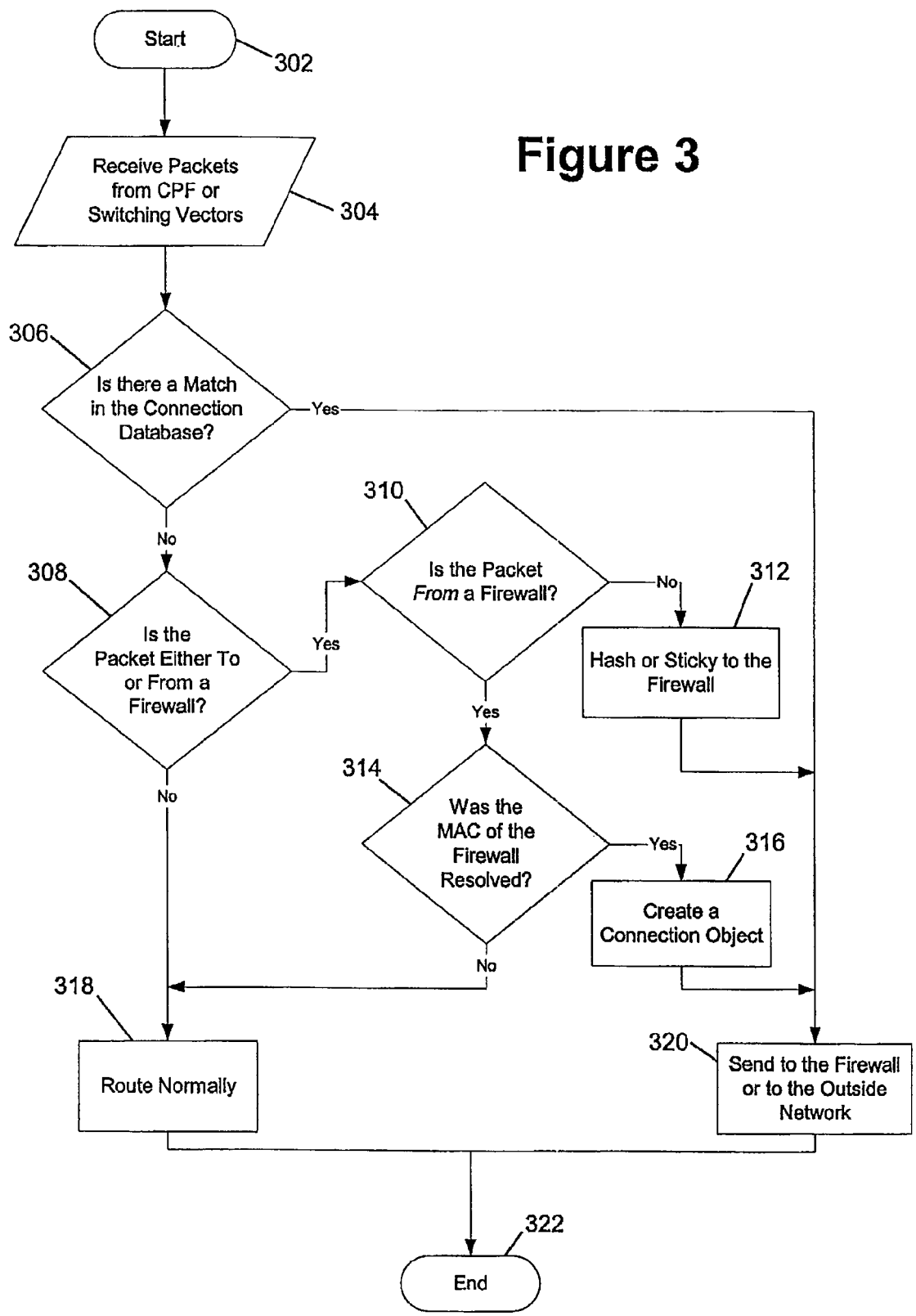
FIG. 3 is a flowchart illustrating an alternate embodiment of the method of the present invention.

An alternative method of the present invention is illustrated in FIG. 3. Referring to FIG. 3, the process begins at step 302. In this case, the packet is received from a common packet filter ("CPF") or from switching vectors in step 304. If the packet has a match in the connection database, step 306, then no further processing is needed and the packet is sent to the firewall or to the outside network in step 320. However, if the packet doesn't have a matching entry in the connection database, then a determination is made whether or not the packet is either going to, or coming from, a firewall, step 308. If the packet did not come from a firewall (meaning that the packet does not have a firewall origin) and it is not destined for a firewall, then the packet is routed normally in step 318. Otherwise, a determination is made whether the packet came from a firewall, i.e., whether the packet has a firewall origin in step 310. If the packet did not come from a firewall, then step 312 is performed where a hash or sticky is made to the firewall connection database and the packet is thereafter sent to the firewall or to the outside network in step 320. If the packet did come from a firewall, then a check is made to determine if the media access control ("MAC") address of the firewall was resolved, step 314. If so, then a connection object is created and stored in the connection database, step 316, and the packet is sent off to the outside network, step 320. If the MAC address of the firewall was not resolved, then the packet is routed normally, step 318. In any case, execution ends in step 322.

The present invention, therefore, is well adapted to carry out the objects and attain both the ends and the advantages mentioned, as well as other benefits inherent therein. While the present invention has been depicted, described, and defined by reference to particular preferred embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. An apparatus, comprising:
   an outbound firewall load balancer that is operable to receive a packet and to determine whether the packet is associated with an open connection such that resources are being consumed as reflected by an entry in an outbound connection database, wherein if the entry is not present in the outbound connection database then a new entry is not recorded for the outbound firewall load balancer, and wherein the packet is forwarded to a selected one of a plurality of firewalls coupled to the outbound firewall load balancer in the case where the entry is present in the outbound connection database, the packet being received by the selected firewall and then communicated to an inbound firewall load balancer, the inbound firewall load balancer being further operable to generate a new entry for the packet once it has received it from the selected firewall, the new entry being provided in an inbound connection database such that resources for the inbound firewall load balancer are then being consumed for an open flow associated with the packet.

2. The apparatus of claim 1, wherein the selected firewall is operable to determine if the packet is associated with malicious traffic and to discard the packet such that it is not communicated to the inbound firewall load balancer in a case where the packet is associated with malicious traffic.

3. The apparatus of claim 1, wherein the outbound firewall load balancer is coupled to one or more servers that are operable to deliver content to the outbound firewall load balancer.

4. The apparatus of claim 1, wherein the inbound firewall load balancer is operable to deliver the packet to a computer that is operable to respond to the packet and that is associated with the open connection.

5. The apparatus of claim 1, wherein if the packet is not associated with an open connection, the outbound firewall load balancer is operable to select one of the firewalls to direct the packet to based on a hash algorithm.

6. The apparatus of claim 1, wherein the inbound firewall load balancer is operable to receive an additional packet from one or more computers that are coupled to the inbound firewall load balancer, the inbound firewall load balancer being coupled to an inbound connection database.

7. The apparatus of claim 6, wherein the inbound firewall load balancer is operable to access the inbound connection database in order to see if there is an open connection associated with the additional packet, and wherein if there is not an open connection for the additional packet then a new entry in the inbound connection database is not made.

8. A method for enlisting one or more end users in a network environment in which loadbalancing occurs, comprising:
  enlisting one or more end users in a billing plan associated with network communications;
  generating a bill associated with one or more of the end users, the bill being based on the billing plan; and
  facilitating network communications for one or more of the end users in response to the end users being enlisted in the billing plan, whereby the network communications includes a protocol that comprises:
    receiving a packet at an outbound firewall load balancer;
    determining whether the packet is associated with an open connection such that resources are being consumed as reflected by an entry in an outbound connection database, wherein if the entry is not present in the outbound connection database then a new entry is not recorded for the outbound firewall load balancer; and
    forwarding the packet to a selected one of a plurality of firewalls coupled to the outbound firewall load balancer in the case where the entry is present in the outbound connection database, wherein the packet may be received by the selected firewall and then communicated to an inbound firewall load balancer, wherein the inbound firewall load balancer is operable to generate a new entry for the packet once it has received it from the selected firewall, the new entry being provided in an inbound connection database such that resources for the inbound firewall load balancer are then being consumed for an open flow associated with the packet.

9. The method of claim 8, wherein the selected firewall is operable to determine if the packet is associated with malicious traffic and to discard the packet such that it is not communicated to the inbound firewall load balancer in a case where the packet is associated with malicious traffic.

10. The method of claim 8, wherein the outbound firewall load balancer is coupled to one or more servers that are operable to deliver content to the outbound firewall load balancer.

11. The method of claim 8, wherein the inbound firewall load balancer is operable to deliver the packet to a computer that is operable to respond to the packet and that is associated with the open connection.

12. The method of claim 8, wherein if the packet is not associated with an open connection, the outbound firewall load balancer is operable to select one of the firewalls to direct the packet to based on a hash algorithm.

13. The method of claim 8, wherein the inbound firewall load balancer is operable to receive an additional packet from one or more computers that are coupled to the inbound firewall load balancer, the inbound firewall load balancer being coupled to an inbound connection database.

14. The method of claim 13, wherein the inbound firewall load balancer is operable to access the inbound connection database in order to see if there is an open connection associated with the additional packet, and wherein if there is not an open connection for the additional packet then a new entry in the inbound connection database is not made.

15. A computer readable medium storing software comprising computer code that is executed by a processor in order to:
  receive a packet at an outbound firewall load balancer;
  determine whether the packet is associated with an open connection such that resources are being consumed as reflected by an entry in an outbound connection database, wherein if the entry is not present in the outbound connection database then a new entry is not recorded for the outbound firewall load balancer; and
  forward the packet to a selected one of a plurality of firewalls coupled to the outbound firewall load balancer in the case where the entry is present in the outbound connection database, wherein the packet may be received by the selected firewall and then communicated to an inbound firewall load balancer, wherein the inbound firewall load balancer is operable to generate a new entry for the packet once it has received it from the selected firewall, the new entry being provided in an inbound connection database such that resources for the inbound firewall load balancer are then being consumed for an open flow associated with the packet.

16. The medium of claim 15, wherein the code operates to determine if the packet is associated with malicious traffic and to discard the packet such that it is not communicated to the inbound firewall load balancer in a case where the packet is associated with malicious traffic.

17. The medium of claim 15, wherein the outbound firewall load balancer is coupled to one or more servers that operate to deliver content to the outbound firewall load balancer.

18. The medium of claim 15, wherein the code operates to deliver the packet to a computer that operates to respond to the packet and that is associated with the open connection.

19. The medium of claim 15, wherein if the packet is not associated with an open connection, the code operates to select one of the firewalls to direct the packet to based on a hash algorithm.

20. The medium of claim 15, wherein the code operates to receive an additional packet from one or more computers that are coupled to the inbound firewall load balancer, the inbound firewall load balancer being coupled to an inbound connection database.

21. The medium of claim 20, wherein the code operates to access the inbound connection database in order to see if there is an open connection associated with the additional packet, and wherein if there is not an open connection for the additional packet then a new entry in the inbound connection database is not made.

* * * * *